United States Patent [19]
Yamazaki et al.

[11] Patent Number: 5,361,774
[45] Date of Patent: Nov. 8, 1994

[54] EQUIVALENT CURRENT DIPOLE LOCALIZATION SYSTEM

[75] Inventors: Toshimasa Yamazaki, Tokyo, Japan; Bob W. Van Dijk, Amsterdam, Netherlands

[73] Assignee: NEC Corporation, Tokyo, Japan

[21] Appl. No.: 71,257

[22] Filed: Jun. 4, 1993

[30] Foreign Application Priority Data

Jun. 5, 1992 [JP] Japan .................................. 4-145176

[51] Int. Cl.$^5$ .......................................... A61B 5/0476
[52] U.S. Cl. ................... 128/731; 128/733; 128/741
[58] Field of Search .................. 128/731.2, 733.4, 741

[56] References Cited
U.S. PATENT DOCUMENTS 5,228,443  7/1993  Tatar .............................. 128/731 X

*Primary Examiner*—Angela D. Sykes
*Attorney, Agent, or Firm*—Foley & Lardner

[57] ABSTRACT

An equivalent dipole localization system comprising, potential measurement means for simultaneously measuring the potentials on a plurality of electrodes attached in a living body, dipole model calculation means for assuming a electric dipole at a given position in the living body having a character of a medium and calculating positions corresponding to the plurality of electrodes formed by the electric dipole, correlation function calculation means for calculating a spacial correlation function of the potential on each electrode from the measurement of the potential measurement means, maximum likelihood estimated error calculation means for calculating an error between a measured value obtained by the potential measurement means and a calculated value obtained by the dipole model calculation means according to calculated values obtained by the correlation function calculation means, and equivalent electric dipole setting means for setting an equivalent electric dipole by obtaining the location, the vector component and the intensity thereof of electric dipole that can minimize the error obtained by the maximum likelihood estimated error calculation means.

6 Claims, 3 Drawing Sheets

FIG. 3
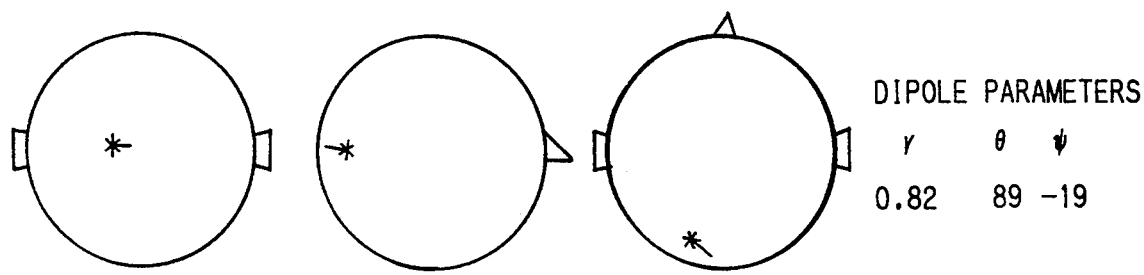
DIPOLE PARAMETERS
| $\gamma$ | $\theta$ | $\psi$ |
|---|---|---|
| 0.82 | 89 | −19 |
FIRST UPPER LIMIT
  ($\gamma_0, \theta_0, \psi_0$) : .90  93.11  −19.11
FIRST DIPOLE
  ($\gamma_0, \theta_0, \psi_0$) : .83  91.61  −19.21
FIRST LOWER LIMIT
  ($\gamma_0, \theta_0, \psi_0$) : .76  90.12  −19.32
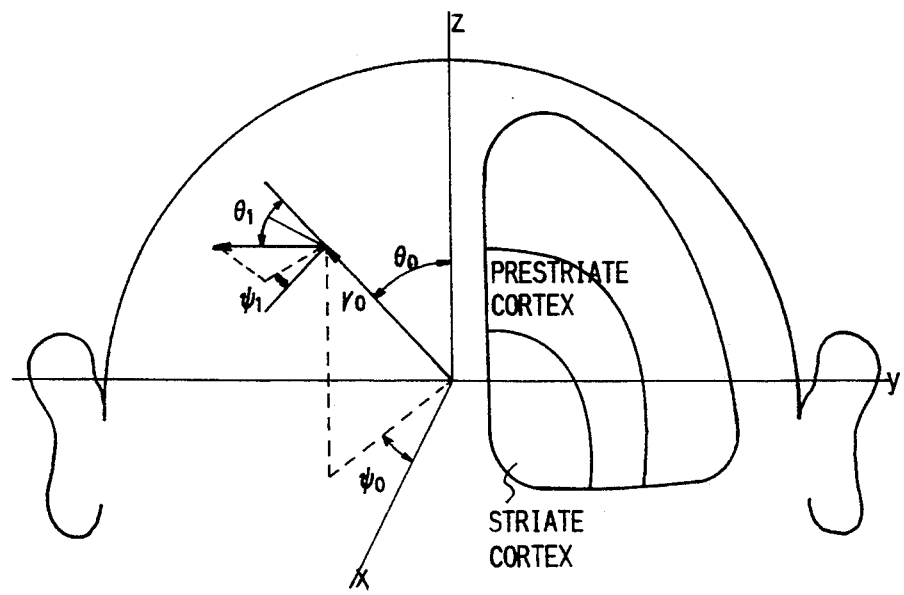

EQUIVALENT CURRENT DIPOLE LOCALIZATION SYSTEM

BACKGROUND OF THE INVENTION

The present invention relates to equivalent electric dipole localization systems and, more particularly, to an equivalent electric dipole localization system, in which the nerve activities of a living body are represented by an electric dipole for obtaining information about the electric dipole sources and also information about the confidence region or confidence limit of the estimated electric dipole inversely from potential distributions projected on the organic surface. The system localizes equivalent current dipole in living tissue.

Heretofore, electroencephalographs, electromyographs, evoked potential adders, etc. have been used to measure potentials evoked on the organic surface by nerve activities of living bodies. Also, recently an equivalent dipole localization method has been proposed, in which activated areas in the living body are estimated by measuring potentials evoked on the organic surface by the nerve activities of the living body. In this method, with stimulation of brain cells in the activated areas, electromotive forces are generated to create potential distributions on the scalp. From such potential distributions, the individual activated areas are corresponded by an electric dipole, and the location and vector component of the dipole are calculated from the potential distributions noted above to estimate the locations of the active brain cells, thereby obtaining numerical representation of the active status of the brain. In a specific proposed method of calculation, a plurality of electrodes are fitted on the organic surface, and potentials generated on the electrodes by the nerve activities of the living body are measured simultaneously. Then, an electric dipole is assumed in a predetermined location in the living body has a medium having a certain character, and the potentials at the locations of the electrodes created by the electric dipole are calculated. Further, the square error between the measured and calculated values obtained for each electrode is obtained, and the location and vector component of the electric dipole that minimize the square error are obtained as those of an equivalent electric dipole.

In the above prior art equivalent electric dipole localization method, the error function to be minimized is a least square error function of the measured and calculated potentials obtained with each electrode. Such an error function, however, is effective only when there is no background noise correlation among the individual electrodes. For example, S. Kuriki, M. Murase and F. Takeuchi, "Locating accuracy of a current source of neuromagnetic response: simulation study for a single current in a spherical conductor", Electroencephalography and Clinical Neurophysiology, 1989, Vol. 73, pp. 499–506, report that errors contained in dipole locations estimated to be greatly electroencephalographically affected amount to 1 cm. Brain waves evoked by visual stimulation may contain, in one waveform, components with close cortical regions such as regions 17 and 18 as sources, and it is very difficult to separate such components and specify the locations thereof with a dipole expressing the individual sources.

What are known about the spacial characters of the background brain waves are surprisingly few, but there are known characters in the cerebrum, and similar characters could be estimated about signals measured on the scalp. For example, J. C. De Munck, P. C. M. Vijn and H. Spekreijise, "Random dipoles as a model for spontaneous EEG- and MEG activity", Advances in Biomagnetism (edited by S. J. Williamson et al., Plenum Press, New York, 1989), show that the spacial characters of background brain waves can be described in terms of a linear relation between variance and inter-electrode distance. If such a spacial correlation is utilized, it will be possible to select better functions as the error function noted above, and the conventional least square error function may be utilized after removing such spacial correlation by filtering.

SUMMARY OF THE INVENTION

The present invention seeks to solve the problems noted above, and its primary object is to provide an equivalent electric dipole localization system, which permits the location and vector component of an equivalent electric dipole to be obtained with high accuracy by providing, as an error function utilized in the equivalent electric dipole localization method, a new error function based on spacial characters of background brain waves.

Another object of the present invention is to provide a method of determining mainly the number of equivalent electric dipoles by providing the confidence region and confidence limit of estimated equivalent electric dipole parameters on the basis of the new error function noted above.

According to the present invention, there is provided an equivalent dipole localization system comprising: potential measurement means for simultaneously measuring the potentials on a plurality of electrodes attached in a living body; dipole model calculation means for assuming a electric dipole at a given position in the living body having a character of a medium and calculating positions corresponding to the plurality of electrodes formed by the electric dipole; correlation function calculation means for calculating a spacial correlation function of the potential on each electrode from the measurement of the potential measurement means; maximum likelihood estimated error calculation means for calculating an error between a measured value obtained by the potential measurement means and a calculated value obtained by the dipole model calculation means according to calculated values obtained by the correlation function calculation means; and equivalent electric dipole setting means for setting an equivalent electric dipole by obtaining the location, the vector component and the intensity thereof of electric dipole that can minimize the error obtained by the maximal estimated error calculation means. The equivalent dipole localization system further comprises confidence region or limit calculation means for calculating a confidence region or limit of the equivalent electric dipole obtained by the equivalent electric dipole setting means.

Other objects and features will be clarified from the following description with reference to the attached drawings.

BRIEF DESCRIPTION OF THE DRAWINGS

FIG. 3 is a view showing an example of output results obtained with the equivalent electric dipole localization system according to the present invention,

DETAILED DESCRIPTION OF THE PREFERRED EMBODIMENTS

Figure 1:
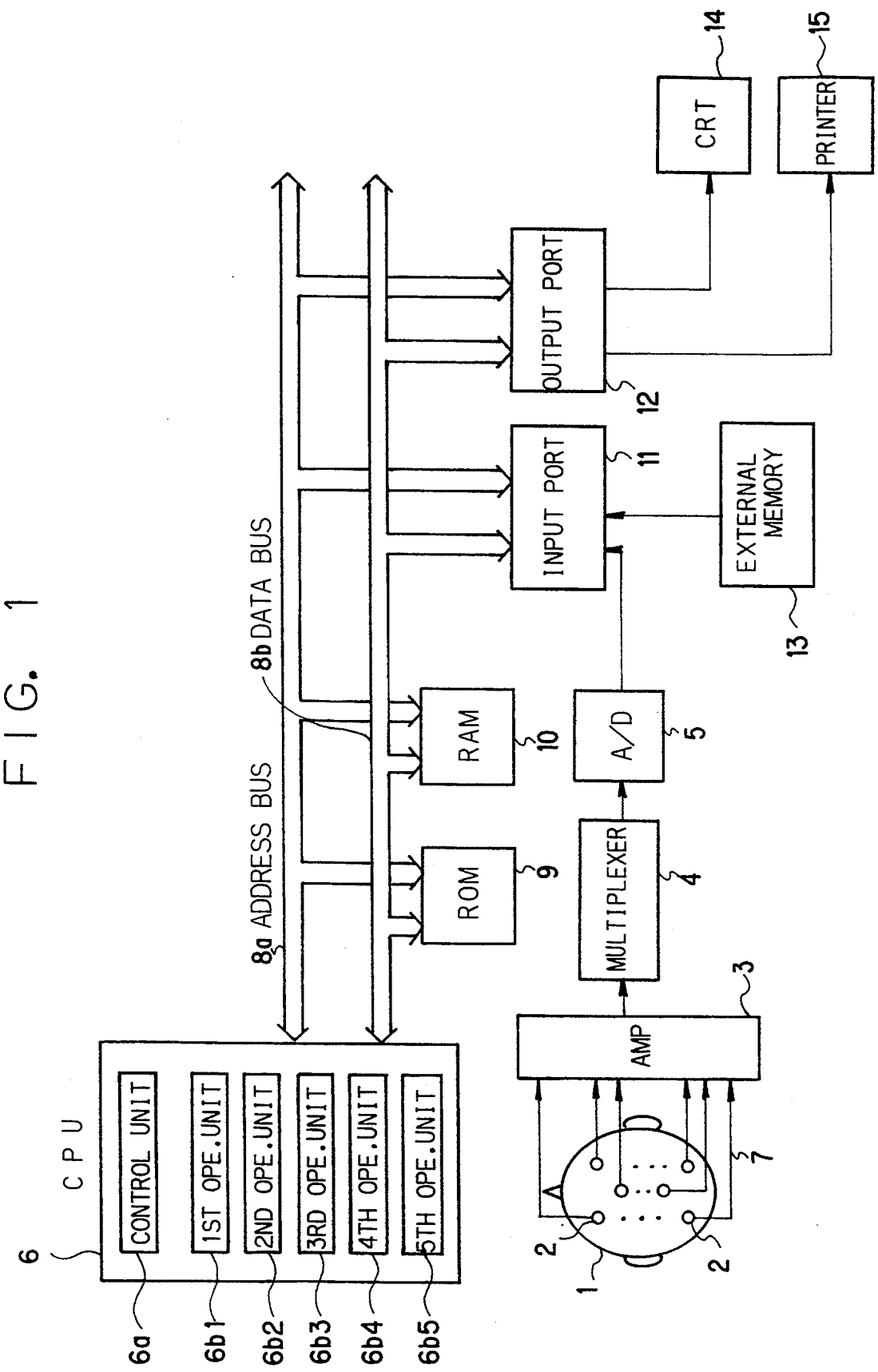
FIG. 1 is a schematic representation of an embodiment of the equivalent electric dipole localization system according to the present invention.

The present invention will now be described in detail with reference to the drawings. FIG. 1 is a schematic representation of an embodiment of the equivalent electric dipole system according to the present invention applied to the brain in a head as living body 1.

In the use of this system, around 30 electrodes 2, for instance, are attached on the organic surface of a portion under measurement, for instance the head, and potentials evoked on the basis of nerve activities in the brain are measured with potential measurement means 7. Measured potential data from the group of electrodes 2 is coupled through an amplifier 3 and a multiplexer 4 to an analog-to-digital converter (A/D) 5, from which digital measured potential data is coupled through an input port 11 to a computer 6. The computer 6 includes a control unit 6a and a first to a fifth operational unit 6b1 to 6b5. An address and a data bus 8a and 8b are connected to a ROM 9, a RAM 10 and an input and an output port 11 and 12. The ROM 9 and RAM 10 serve as memory means for storing necessary programs for signal processing and also data from the potential measurement means 7. The first to fifth operational units 6b1 to 6b5 of the computer 6 each include data extraction means for extracting evoked potential data and background brain wave data, correlation function calculation means, maximum likelihood estimated error calculation means, equivalent electric dipole setting means, and confidence region/confidence limit calculation means. To the input port 11 is connected an external memory unit 13, in which programs for obtaining equivalent electric dipole are stored, and to the output port 12 are connected a CRT or like display means 14 for displaying results of calculations performed in the computer 6 and a printer 15 for storing data and waveforms displayed on the display means 14.

The operation of the embodiment having the above construction will now be described with reference to the flow chart of FIG. 2.

Figure 2:
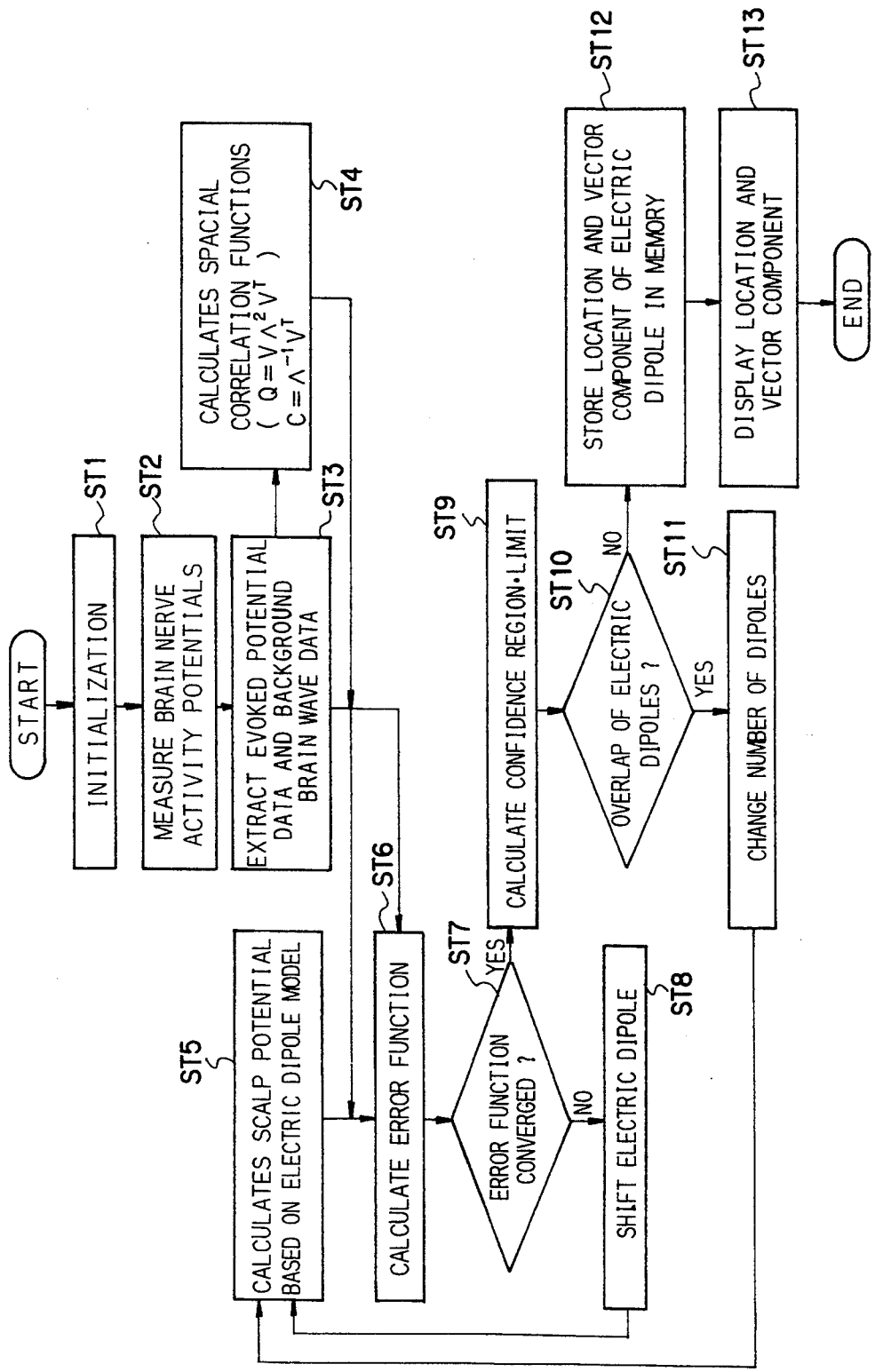
FIG. 2 is a flow chart for explaining an example of operation of the system shown in FIG. 1.

Referring to FIG. 2, in a first step ST1 the embodiment of the equivalent electric dipole localization system is initialized by turning on a power source (not shown).

In a subsequent second step ST2, brain nerve activity potentials are measured by attaching around 30 electrodes on the head as the living body 1 as shown in FIG. 2. The nerve activity potentials may be those evoked in response to various stimuli, such as electric, optical, acoustical ones, or those in the absence of any stimulus. The measured potential data is coupled through the amplifier 3 and the multiplexer 4 to the A/D 5 and thence as digital data through the input port 11 to the computer 6 to be stored in the RAM 10.

In a third step ST3, the first operational unit 6b1 extracts evoked potential data R and background brain wave data η from the measured potential data stored in the RAM 10. Where visually evoked potentials are measured, for instance, samples are collected for a predetermined period of time as a sweep for each electrode whenever a trigger signal is generated from a visual stimulator. These data are used to extract the evoked potential data by taking the arithmetic mean of the individual sweeps, and also they are used directly as the background brain wave data. Denoting the number of electrodes by I and the number of samples in each sweep time by J, the evoked potential data is obtained as I×J matrix r $$r_{ij}(i=1,\ldots,I, J=1,\ldots,J)$$

The background brain wave data may be obtained by subtracting the odd sweep data from the even sweep data. Alternatively, depending on the character of the visual stimulus what is obtained by filtering the measured potential data through a digital filter (such as a low-pass filter, a high-pass filter or a band-pass filter) may be used as the background brain wave data.

In a fourth step ST4, the second operational unit 6b2 calculates the spacial correlation functions among all the electrodes with respect to the background brain wave data obtained in the step ST3. The spacial correlation functions may be calculated by using, for instance, formula (1)

$$\frac{N\Sigma XY - \Sigma X \Sigma Y}{N^2 S_X S_Y} \quad (1)$$

where X and Y are measured potentials on electrodes x and y, N is the number of time samples, and $S_x$ and $S_y$ are standard deviations of X and Y. With the number I of electrodes, an I-th order square matrix Q can be obtained. The matrix Q is a symmetric matrix, and if it is a non-negative, it is capable of eigenvalue decomposition as $$Q = V \wedge {}^2 V^T \quad (2)$$

where $V$ is an orthogonal matrix, $\wedge$ is a diagonal matrix having the eigenvalue of the matrix Q as its component, and T is the transposition of matrix. In a fifth step ST5, a matrix C defined by formula (3)

$$C = \wedge^{-1} V^T \quad (3)$$

is calculated by utilizing the above eigenvalue decomposition.

Then, in the same step ST5 the third operational unit 6b3 calculates potentials $r^-$ generated on the scalp from nerve activity potential sources assumed as an electric dipole. The potentials $r^-$ can be expressed by formula (4)

$$r^{31}{}_{ij} = \Sigma \phi_l(p_l) S_{lj} \quad (4)$$

$$(i=1,\ldots,I, j=1,\ldots,J, l=1,\ldots,L)$$

where $S_{lj}$ is the lapsed time on the amplitude an l-th potential source, $\phi_l(p_l)$ is the potential generated on an electrode i by the l-th potential source and has a potential source parameter $p_l$. This function can be written as $$\phi_{il} = \Sigma \mu_{l,\lambda} \phi_{i,\lambda}(q_l) \quad (5$$

Here, $\lambda=1$ represents a radial component of the potential source, and $\lambda=2$ and $\lambda=3$ both represent tangential components of the potential source. Further, $\phi_{i,\lambda}(q_l)$ specifies the relationship among the potential source, medium character and potential and has a potential source location parameter $q_l$.

In a subsequent sixth step ST6, the fourth operational unit 6b4 calculates an error function between the extracted evoked potential data obtained in the third step ST3 and calculated evoked potential data obtained in the fifth step ST5. This error function is defined by formula (6) given hereinunder. The grounds for utilizing this formula will now be described.

Denoting the extracted evoked potential data obtained in the third step ST3 by $r_{ij}$ and the calculated evoked potential data obtained in the fifth step ST5 by $r^-_{ij}$, the relation between these two data can be given by formula (6.1)

$$r_{ij}=r^-_{ij}(p)+\eta_{ij} \qquad (6.1)$$

$$(i=1,\ldots,I, j=1,\ldots,J)$$

where p is a parameter of the dipole to be estimated, and $\eta_{ij}$ is additive noise and represents background brain wave. If $\eta_{ij}$ satisfies $$E(\eta_{ij})=0,\ E(\eta_{ij}\eta_{i'j'})=Q_{iji'j'} \qquad (6.2)$$

the dipole model parameter p which minimizes the error function given as formula (6.3) is the optimal parameter in the sense that the parameter has minimum variance. This is commonly termed Gauss-Marcov theorem.

$$H(p)=\Sigma(r_{ij}-r^-_{ij})Q_{iji'j'}{}^{-1}(r_{i'j'}-r^-_{i'j'}) \qquad (6.3)$$

$$(i,i'=1,\ldots,I;\ j,j'=1,\ldots,J)$$

When it is assumed that the background brain waves are the stationary process, the covariance matrix $Q_{iji'j'}$ of the background brain waves can be estimated using actual brain wave data. The estimation adopts cross correlation function if $j\neq j'$ and $i\neq i'$, autocorrelation function if $j\neq j'$ and $i=i'$, spacial correlation function if $j=j'$ and $i\neq i'$, and identically unity if $j=j'$ and $i=i'$. A case will now be considered, in which the covariance of the background brain waves is given by only the spacial correlation function. In this case, the matrix Q is an first order symmetrical matrix and capable of eigenvalue decomposition.

$$Q=V\Lambda^2 V^T \qquad (6.4)$$

where $V$ is an orthogonal matrix, $\Lambda$ is a diagonal matrix given as $$\Lambda = diag\ (\sqrt{\lambda_1},\ldots,\sqrt{\lambda_I})$$

Here, $\lambda_k$ ($k=1,\ldots,I$) is the eigenvalue of the matrix Q. Thus, the error function of the formula (6.3) is given as formula (6).

$$H(p)=T_r[(CR-CR^-(p))^T(CR-CR^-(p))] \qquad (6)$$

where $$[R]_{ij} = r_{ij}$$
$$[R^-]_{ij} = r^-_{ij}$$
$$C = \Lambda^{-1}V^T$$

The matrix C is obtained in the fourth step ST4 (formula (3)).

In a subsequent seventh step ST7, the location and vector component of electric dipole that make the error function given by the formula (6) in the sixth step ST6 minimum are obtained (which is a commonly termed inverse problem), and a check is done by the computer 6 as to whether the value of the error function is no higher than the reference value.

Here, setting $$R_c \equiv CR, \qquad (7.1)$$

and $$\Psi_c \equiv C\Psi \qquad (7.2)$$

where $[\Psi]_{il}=\Psi_i(P_l)$ and $\Psi_i(p_l)$ is given by the formula (5), leads to quite an equivalent problem to the inverse problem algorithm proposed by J. C. De Munck in "The estimation of time varying dipoles on the basis of evoked potentials", Electroencephalography Clinical and Neurophysiology, Vol. 77, 1990, pp. 156–160. In the inverse problem algorithm proposed by J. C. De Munck, two different linear parameters contained in a dipole model (time function of potential source amplitude and direction of the dipole) and one non-linear parameter (location of the dipole) are handled dividedly, and thus the algorithm comprises three steps. A first step is to optimize the time function, a second step is to optimize the direction parameter, and a third step is to optimize the location parameter, these steps being executed in the mentioned order.

If the error function is no greater than the reference value, an eighth step ST8 is executed, in which the location of the electric dipole is shifted by the Marquardt's method, and then the routine is returned to the fifth step ST5. This operation is iterated until the value of the error function is converged. These operations are all executed in the fourth operational unit 6b4. The Marquardt's method is one of the non-linear optimization methods and executes iterated calculation to obtain approximation of the solution. In the iterated calculation, it is necessary to make a variable shift for reducing the value of the error function. As an algorithm concerning the direction and extent of the shift, the interpolation-extrapolation method may be utilized. The Marquardt's method and the interpolation-extrapolation method are described in, for instance, Y. Bard, "Nonlinear Parameter Estimation", Academic Press Inc., 1974.

When the value of the error function is converged to be less than the reference value, thus yielding "YES", a ninth step ST9 is executed, in which the fifth operational unit 6b5 calculates the confidence region of the estimated electric dipole parameter. Especially, the confidence region of the non-linear parameter q* is by an (N×L)-dimensional ellipsoid Gp given by formula (8).

$$G_p=[q:(q-q^*)^T B(q-q^*)\leq r^2] \qquad (8)$$

where the matrix B is an NL-th square matrix, and the individual components are obtainable as $$B_{kl}=\Sigma A_{ijk}(q^*)A_{ijl}(q^*) \qquad (8.1)$$

$$A_{ijk}\equiv \partial r^-{}_{Cij}/\partial q_k$$

where $r^-{}_{Cij}\equiv [CR^-]_{ij}$, $r^2$ is the value of p % point in $\chi^2$ distribution with a degree of freedom of NL, $$P[\chi^2_{NL}\leq r^2]=p(\%)$$

and N is the number of non-linear parameters contained in an electric dipole. The formula (8) means that proper non-linear parameter is present with a probability of p % inside the ellipsoid given by it.

Further, by setting the eigenvalue decomposition of the matrix B defined by the formula (8.1) as $$B = \Sigma \alpha^2_k v_k v_k^T \quad (8.3)$$

the confidence region Gp is $$Gp = [q : \Sigma \beta^2_k [(q - q^*)^T v_k]^2 / r^2 \leq 1] \quad (8.4)$$

where $\beta^2_k$ and $v_k$ are eigenvalue and characteristic vector of the matrix B.

The p % confidence limit for the true parameter $q_i$ (i = 1, ..., NL) is given as $$q^*_i - \delta_i \leq q_i \leq q^*_i + \delta_i \quad (9.1)$$

where $\delta_i$ is the maximum value of $|q^*_i - q^-_i|$ and given as $$\delta_i = [\Sigma (v_{ik}/\beta_k)^2]^{\frac{1}{2}} \quad (9.2)$$

with $vi = (v_{i1} \ldots v_{i,NL})^T$

In a subsequent tenth step ST10, in case where there are two or more assumed electric dipoles, a check as to whether there is an overlap of electric dipoles is done according to the values of the confidence region and confidence limit calculated in the ninth step. If there is an overlap of electric dipoles, an eleventh step ST11 is executed, in which the number of dipoles is changed, and the routine is returned to the fifth step ST5. This operation is iterated until there is no overlap of dipoles.

When there is no overlap of dipoles, thus yielding "NO", a twelfth step ST12 is executed, in which the location and vector component of the equivalent electric dipole are stored in the RAM 10 or like memory. Then, in a thirteenth step ST13 the location and vector component of electric dipole stored in the twelfth step ST12 are read out and coupled to the display means 14 and printer 15.

FIG. 3 shows output results of the equivalent dipole localization system according to the invention, which are displayed on the printer. The upper three circles are a rear, a side and a plan view of a head model approximation by a sphere. In each circle, the estimated dipole is shown by a vector. The asterisk represents the location of the dipole, and the bar represents the magnitude. In the central part of the Figure, the upper and lower limits of the estimated dipole parameter are shown. These values are obtained as a result of calculation executed with the formulas (9.1) and (9.2). The location of the dipole is expressed as a parameter set($r_0$, $\theta_0$, $\phi_0$), where $r_0$ represents the radial direction which is expressed as a ratio in which the head radius is unity. Other parameters are shown in the lower part of the FIG. 3.

In the above embodiment, the third to thirteenth steps ST3 to ST13 are all executed by the control unit 6a and first to fifth operational units 6b1 to 6b5 of the computer 6.

As has been described in the foregoing, according to the invention it is possible to localize an electric dipole with high accuracy. In addition, it is possible to promote elucidation of information processing in the brain by numerically converting not only information about location of lesion thought to be a potential source (for instance location of epilepsia focus) but information about location having excitability by external stimulation (such as optical, graphical, acoustical and electrical stimulation).

Further, according to the invention it is possible to obtain the confidence region and confidence limit of each of a plurality of assumed electric dipoles. If two electric dipoles are assumed such that their confidence regions or limits overlap, the number of electric dipoles should be thought to be one. Thus, according to the invention it is possible to provide effective means for checking the number of electric dipoles, which frequently poses problems in the equivalent electric dipole localization method.

What is claimed is:

1. An equivalent dipole localization system comprising:

potential measurement means for simultaneously measuring the potentials on a plurality of electrodes fitted on a living body;

dipole model calculation means for assuming a electric dipole at a given position on the living body having a character of a medium and calculating positions corresponding to said plurality of electrodes formed by said electric dipole;

correlation function calculation means for calculating a spacial correlation function of the potential on each electrode from the measurement of said potential measurement means;

maximum likelihood estimated error calculation means for calculating an error between a measured value obtained by said potential measurement means and a calculated value obtained by said dipole model calculation means according to calculated values obtained by said correlation function calculation means; and equivalent electric dipole setting means for setting an equivalent electric dipole by obtaining the location, the vector component and the intensity of said electric dipole that can minimize the error obtained by said maximal estimated error calculation means.

2. The equivalent dipole localization system according to claim 1, further comprising confidence region calculation means for calculating a confidence region of the equivalent electric dipole obtained by said equivalent electric dipole setting means.

3. The equivalent dipole localization system according to claim 1, further comprising confidence region calculation means for calculating a confidence limit of the equivalent electric dipole obtained by said equivalent electric dipole setting means.

4. A method of obtaining location and vector components of an equivalent electric dipole comprising the steps of:

simultaneously measuring, as first values, potentials on a plurality of electrodes fitted on a living body;

assuming an electric dipole at a given position on the living body having a character of a medium and calculating, as second values, positions corresponding to the plurality of electrodes formed by the electric dipole;

calculating, as third values, a spacial correlation function of the potential on each electrode from the first values;

calculating an error between the first values and corresponding ones of the second values according to the third values; and setting an equivalent electric dipole by obtaining the location, the vector component and the intensity of the electric dipole that can minimize the error.

5. The method of claim 4, further comprising the step of:

calculating a confidence region of the equivalent electric dipole.

6. The method of claim 4, further comprising the step of:

calculating a confidence limit of the equivalent electric dipole.

* * * * *